US008035651B2

(12) United States Patent
Kang et al.

(10) Patent No.: US 8,035,651 B2
(45) Date of Patent: Oct. 11, 2011

(54) METHOD OF ADJUSTING DISPLAYING STATE OF DISPLAY APPARATUS

(75) Inventors: Hee-young Kang, Suwon-si (KR); Sang-hak Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1331 days.

(21) Appl. No.: 11/208,756

(22) Filed: Aug. 23, 2005

(65) Prior Publication Data

US 2006/0044321 A1 Mar. 2, 2006

(30) Foreign Application Priority Data

Aug. 25, 2004 (KR) .................... 10-2004-0067128

(51) Int. Cl.
*G09G 5/02* (2006.01)
(52) U.S. Cl. ...................... 345/589; 345/603
(58) Field of Classification Search .......... 349/72; 345/589
See application file for complete search history.

(56) References Cited

U.S. PATENT DOCUMENTS

| | | | | |
|---|---|---|---|---|
| 5,831,672 | A * | 11/1998 | Takei | 348/225.1 |
| 6,441,563 | B1 * | 8/2002 | Kao et al. | 315/169.3 |
| 6,862,012 | B1 | 3/2005 | Funakoshi et al. | |
| 7,075,503 | B2 * | 7/2006 | Shinohara | 345/60 |
| 7,109,990 | B1 * | 9/2006 | Oler et al. | 345/428 |
| 7,126,562 | B1 * | 10/2006 | Irie et al. | 345/63 |
| 7,199,822 | B2 * | 4/2007 | Fujino | 348/223.1 |
| 2002/0063666 | A1 | 5/2002 | Kang et al. | |
| 2002/0163490 | A1 | 11/2002 | Nose | |
| 2003/0020725 | A1 | 1/2003 | Matsuda | |
| 2003/0210250 | A1 * | 11/2003 | Kim et al. | 345/589 |
| 2004/0036708 | A1 * | 2/2004 | Evanicky et al. | 345/691 |
| 2004/0155837 | A1 * | 8/2004 | Yu et al. | 345/63 |
| 2006/0017742 | A1 * | 1/2006 | Hsu | 345/589 |

FOREIGN PATENT DOCUMENTS

| | | |
|---|---|---|
| CN | 1293521 | 5/2001 |
| JP | 09-135455 | 5/1997 |
| JP | 11-202837 | 7/1999 |
| JP | 2001-119717 | 4/2001 |
| JP | 2002-123232 | 4/2002 |

(Continued)

OTHER PUBLICATIONS

Chinese Office Action dated Nov. 23, 2007 issued in CN 200510096600.3.

(Continued)

*Primary Examiner* — Xiao Wu
*Assistant Examiner* — Maurice L McDowell, Jr.
(74) *Attorney, Agent, or Firm* — Stanzione & Kim, LLP (57) ABSTRACT

A method of adjusting a displaying state of a display apparatus includes determining a reference color temperature and a reference $\Delta u'v'$, determining setting color temperatures corresponding to gradations of a gray level according to the reference color temperature to make color temperature differences between adjacent gradations of the gray level be within a predetermined color temperature range, measuring coordinates according to the gradations within a gray area formed by the gray level and displayable in the display apparatus on a predetermined color coordinates system corresponding to the reference $\Delta u'v'$ and the setting color temperatures corresponding to the gradations, and setting the coordinates corresponding to the gradations measured about each gradation of the gray level of the display apparatus. Thus the method of adjusting a displaying state of a display apparatus varies a color sensation to have directionality and linearity between gradations of a gray level, thereby improving color representation.

19 Claims, 5 Drawing Sheets

FOREIGN PATENT DOCUMENTS

| | | |
|---|---|---|
| JP | 2003-29724 | 1/2003 |
| KR | 10-2002-0024668 A | 4/2002 |
| KR | 2003-5748 | 1/2003 |
| KR | 2003-89272 | 11/2003 |
| KR | 2004-34364 | 4/2004 |

OTHER PUBLICATIONS

European Office Action dated Dec. 2, 2005 issued in PJP/49036EP1.

Michael H. Brill et al., "23.1: Invited Paper: Isoluminous Color Difference Metric for Application to Displays", SID 02 Digest, vol. XXXIII, 2002, pp. 809-811.

"Type 20.8 QXGA Color TFT/LCD Module, Model Name: ITQX203", IDTech Engineering Specification, Mar. 12, 2002, pp. 26-35.

"TCO '03 Displays Requirements", Swedish Confederation of Professional Employees, Jan. 26, 2004, pp. 56-67.

European Office Action dated Dec. 2, 2005 issued in European application 05107801.2.

KR Notice of Allowance issued Mar. 10, 2011 in KR Application No. 10-2004-0067128.

* cited by examiner

METHOD OF ADJUSTING DISPLAYING STATE OF DISPLAY APPARATUS

CROSS-REFERENCE TO RELATED APPLICATIONS

This application claims the benefit under 35 U.S.C §119 of Korean Patent Application No. 2004-67128, filed on Aug. 25, 2004, in the Korean Intellectual Property Office, the disclosure of which is incorporated herein in its entirety and by reference.

BACKGROUND OF THE INVENTION

1. Field of the Invention

The present general inventive concept relates to a method of adjusting a displaying state of a display apparatus, and more particularly, to a method of adjusting a displaying state of a display apparatus, in which a color sensation is varied to have directionality and linearity between gradations of a gray level, thereby improving color representation of the display apparatus.

2. Description of the Related Art

Recently, display apparatuses, such as a monitor for a personal computer, a television, and the like, have been required to be lightweight and thin. To satisfy these requirements, a liquid crystal display (LCD) module has been widely used instead of a conventional cathode ray tube (CRT) as the display apparatus.

In the LCD module, a liquid crystal having anisotropic permittivity is filled between two substrates, and the liquid crystal becomes opaque or transparent according to the intensity of an electric field applied thereto, thereby displaying a picture.

The LCD module cannot display a real color because of displaying characteristics of the LCD module. For example, white displayed on the LCD module inclines toward red even though a video signal of a white level is processed. Further, the more a signal approaches a black level, the more color inclines toward blue.

There are various standards for color representation of the display apparatus. For example, The Swedish Confederation of Professional Employees (TCO) 03 standard requires that a color temperature variation ($\Delta u'v'$) at a gradation of a gray level of 105 or more be smaller than 0.02 to make the display apparatus have a high color maintenance regardless of a variation of brightness.

With respect to the TCO 03 standard, a conventional display apparatus has the following problems.

The conventional display apparatus has a color temperature distribution ranging from 7,200K to 11,500K with regard to all gradations, so that the color temperature is widely varied according to the gradation. Actually, the more the color deviates from a white level and approaches a black level, the more the color inclines toward blue or a dark color sensation. Thus, even though a picture contains a real color, the color is distorted, thereby deteriorating the color representation.

Figure 1:
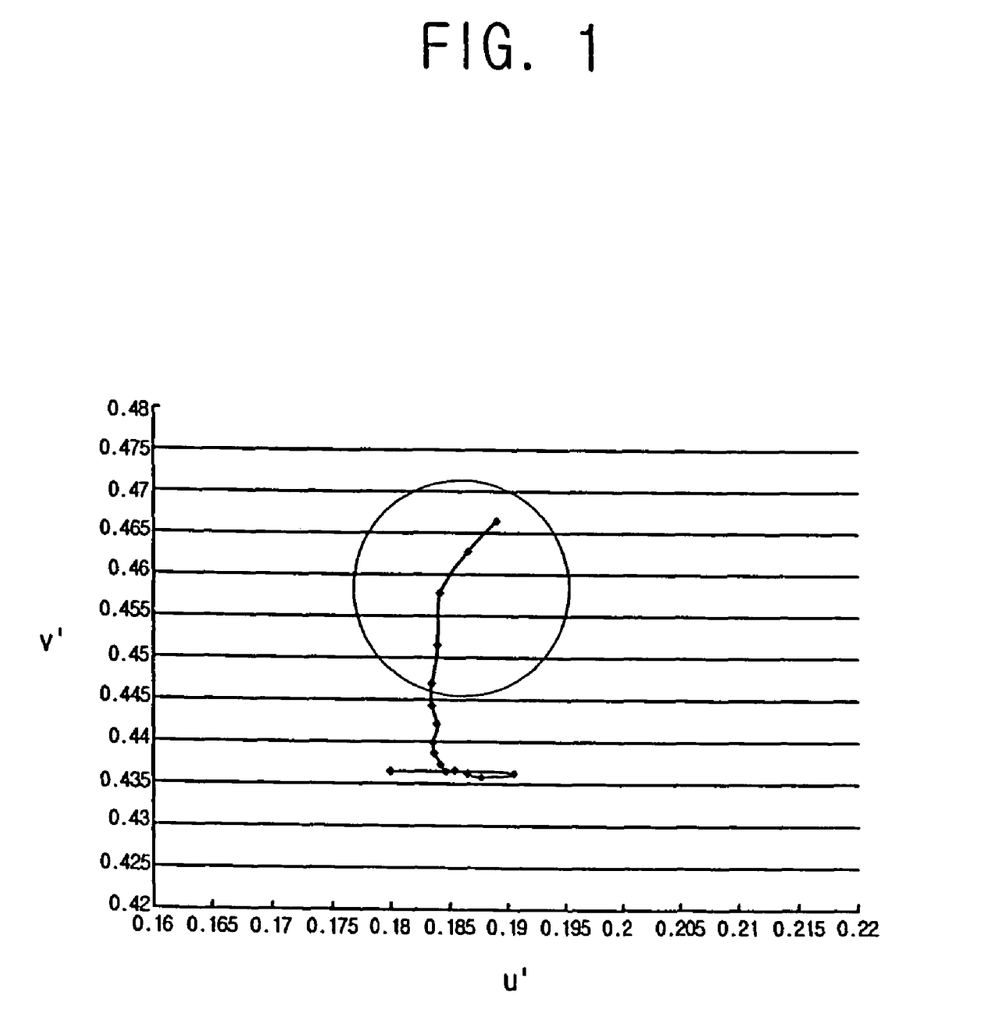
FIG. 1 is a graph illustrating data measured with respect to a picture of a gray level in a conventional display apparatus.

Further, in the conventional display apparatus comprising the LCD module, the $\Delta u'v'$ is not smaller than 0.02 at the gradation of 105 or more, and is insufficient to satisfy the TCO 03 standard. FIG. 1 is a graph illustrating data measured with respect to a picture of a gray level in the LCD module of the conventional display apparatus. That is, FIG. 1 shows the $\Delta u'v'$ measured with respect to a gray level of 16 gradations. As shown in FIG. 1, the $\Delta u'v'$ is not smaller than 0.02 at the gradation of 105 or more.

To satisfy the TCO 03 standard, the conventional display apparatus divides the gray level into a high and a low, thereby adjusting a red, green, blue (RGB) gain value and an offset value. As another method, a predetermined color value is subtracted from or added to an RGB gamma value, so that the $\Delta u'v'$ is adjusted to be smaller than 0.02.

Figure 2:
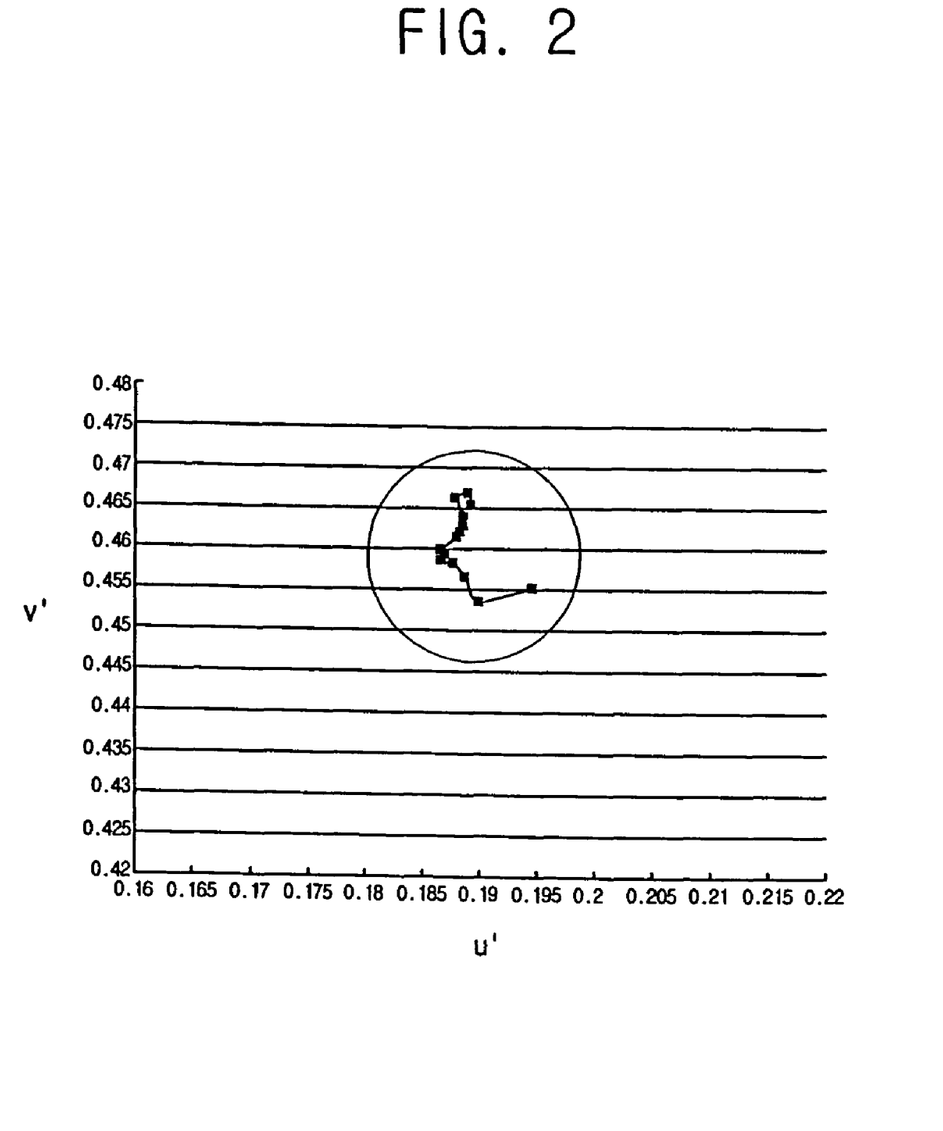
FIG. 2 is a graph illustrating data measured after adjusting an RGB gamma value in the conventional display apparatus of FIG. 1.

FIG. 2 is a graph illustrating the data measured after adjusting the RGB gamma value. Referring to FIG. 2, the RGB gamma value of the conventional display apparatus is adjusted, thereby adjusting the $\Delta u'v'$ to be smaller than 0.02 at all of the gradations. However, according to displaying characteristics of FIG. 2, coordinate values of each gradation are dispersively distributed without directionality, so that color sensation is distorted and variegated when a picture is displayed on the LCD module.

Further, in the conventional display apparatus, the $\Delta u'v'$ is made smaller than 0.02 at all of the gradations by adjusting the RGB gamma value, but the $\Delta u'v'$ is different according to the gradations. Here, the $\Delta u'v'$ affects the color sensation at each gradation, so that a linearity of all of the gradations is deteriorated when the $\Delta u'v'$ is different between the gradations.

SUMMARY OF THE INVENTION

Accordingly, the present general inventive concept provides a method of adjusting a displaying state of a display apparatus, in which a color sensation is varied to have directionality and linearity between gradations of a gray level, thereby improving color representation.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a method of adjusting a displaying state of a display apparatus, the method comprising determining a reference color temperature and a reference color temperature variation (reference $\Delta u'v'$), determining setting color temperatures corresponding to gradations of a gray level according to the reference color temperature to make color temperature differences between adjacent gradations of the gray level be within a predetermined color temperature range, measuring coordinates according to the gradations within a gray area formed by the gray level displayable in the display apparatus on a predetermined color coordinate system corresponding to the reference $\Delta u'v'$ and the setting color temperatures corresponding to the gradations, and setting the coordinates corresponding to the gradations measured about each gradation of the gray level of the display apparatus.

The color coordinate system may include one of a CbCr coordinate system and an XY coordinate system.

The determining of the reference color temperature and the reference $\Delta u'v'$ may comprise inputting a reference video signal of a white level into the display apparatus, measuring a color temperature and a color temperature variation ($\Delta u'v'$) of a reference picture displayed on the display apparatus corresponding to the reference video signal, and determining the reference color temperature and the reference $\Delta u'v'$ according to the measured color temperature and the measured $\Delta u'v'$ of the reference picture.

The determining of the setting color temperatures corresponding to the gradations of the gray level according to the reference color temperature to make the color temperature differences between the adjacent gradations of the gray level be within the predetermined color temperature range may comprise determining the setting color temperature according to each gradation to linearly increase with respect to the respective gradations of the gray level from the measured color temperature of the reference picture.

The reference Δu'v' may be smaller than 0.02.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 3:
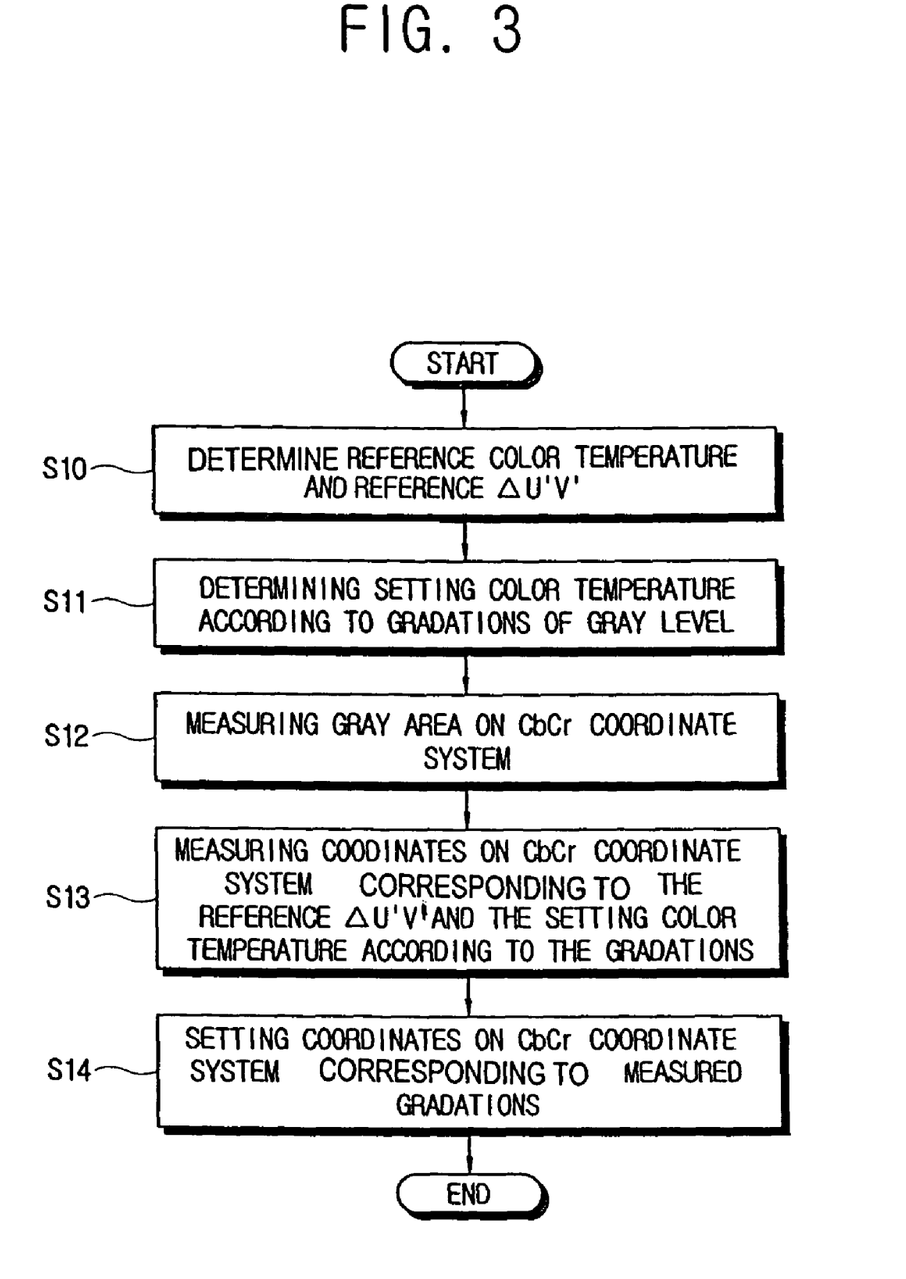
FIG. 3 is a control flowchart illustrating a method of adjusting a displaying state of a display apparatus according to an embodiment of the present general inventive concept.

FIG. 3 is a control flowchart illustrating a method of adjusting a displaying state of a display apparatus according to an embodiment of the present general inventive concept. Referring to FIG. 3, to adjust the displaying state of the display apparatus, first, a reference color temperature and a reference color temperature variation (reference Δu'v') are determined at operation S10.

For example, the reference color temperature and the reference Δu'v' can be determined as follows. First, a reference video signal of a white level is input to the display apparatus.

Then, a color temperature and a color temperature variation (Δu'v') are measured with respect to a reference picture based on the reference video signal of the white level displayed on the display apparatus.

Then, the reference color temperature and the reference Δu'v' are determined according to the color temperature and the Δu'v' measured with respect to the reference picture. For example, when the reference picture has the color temperature of 9,000K and the Δu'v' of 0.007, these values can be considered inherent displaying characteristics of the display apparatus and accepted as the reference color temperature and the reference Δu'v'. Thus, at operation S10, the reference color temperature and the reference Δu'v' are determined according to the measured color temperature and the measured Δu'v' of the reference picture.

The reference color temperature and the reference Δu'v' can be determined to be 7,500K and 0.01, respectively. The reference Δu'v' can be smaller than 0.02 to satisfy the TCO 03 standard.

The reference color temperature and the reference Δu'v' determined by the foregoing method are used as the color temperature and the Δu'v' at the white level, i.e., at a 255 gradation, respectively.

After determining the reference color temperature and the reference Δu'v', at operation S11, a setting color temperature corresponding to each gradation of a gray level is determined according to the reference color temperature. Here, the setting color temperature corresponding to each gradation is determined when a color temperature difference between the setting color temperatures corresponding to adjacent gradations of the gray level is within a predetermined color temperature range. That is, the setting color temperature corresponding to each gradation is determined so as to make the color temperature differences between the adjacent gradations be within the predetermined color temperature range.

Here, the setting color temperature corresponding to each gradation of the gray level can be determined to linearly increase with respect to the respective gradations as the gradations are deviated from the white level toward a black level. For example, as described above, in the case where the reference color temperature corresponding to 255 gradation is determined to be 7,500K, the setting color temperature corresponding to 240 gradation is determined to be 7,600K, the setting color temperature corresponding to 224 gradation is determined to be 7,700K, the setting color temperature corresponding to 208 gradation is determined as 7,800K, and so on. Thus, the setting color temperature is linearly increased with respect to the respective gradations of the gray level, so that a color sensation of the gray level has directionality.

After determining the setting color temperatures according to the respective gradations of the gray level, at operation S12, a gray area (GA) formed by the gray level and displayable in the display apparatus is measured on a predetermined color coordinate system.

Figure 4:
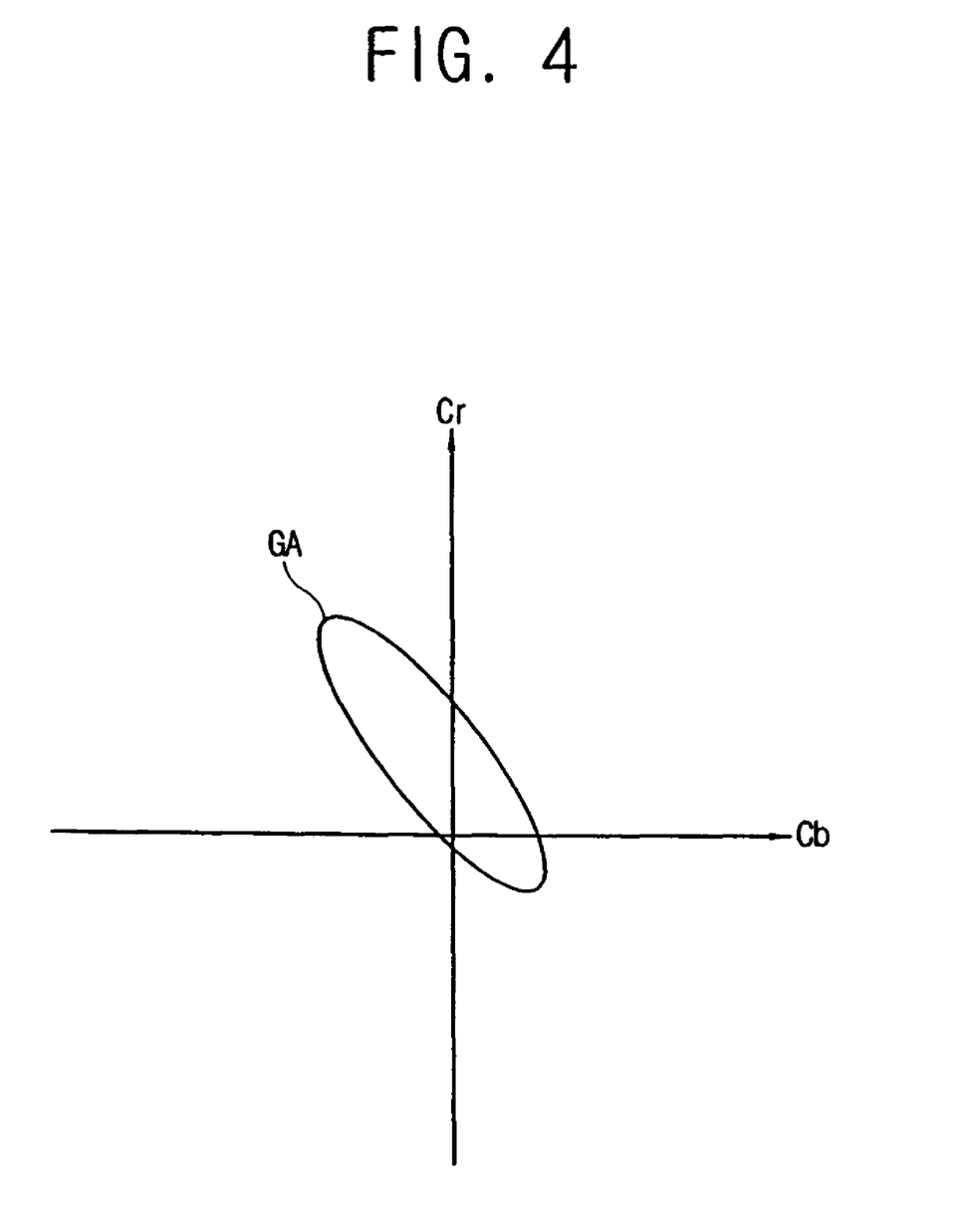
FIG. 4 is a graph illustrating a CbCr coordinates system of the display apparatus according to an embodiment of the present general inventive concept.

Here, a CbCr coordinate system can be used as the color coordinate system. Alternatively, an XY coordinate system may be used. That is, at operation S12, the gray area (GA) formed by the gray level and displayable in the display apparatus can be, as shown in FIG. 4, measured on the CbCr coordinate system by measuring data about a picture displayed on the display apparatus.

At operation S13, coordinates corresponding to the reference Δu'v' and the setting temperature corresponding to each gradation are measured within the gray area (GA) formed by the gray level displayable in the display apparatus on the predetermined color coordinate system. In the case in which the CbCr coordinate system is used, the coordinates are measured on the CbCr coordinate system corresponding to the reference Δu'v' and the setting color temperature corresponding to each gradation of the gray level.

That is, as described above, in the case where the reference Δu'v' and the setting color temperature corresponding to each gradation are determined as shown in Table 1, the coordinates are measured corresponding to the reference Δu'v' and the setting color temperature a corresponding to each gradation on the CbCr coordinate system.

TABLE 1

| Gradation | Setting color temperature | Δu'v' |
|---|---|---|
| . | . | . |
| . | . | . |
| . | . | . |
| 176 | 8,000 K | 0.01 |
| 192 | 7,900 K | 0.01 |

TABLE 1-continued

| Gradation | Setting color temperature | Δu'v' |
|---|---|---|
| 208 | 7,800 K | 0.01 |
| 224 | 7,700 K | 0.01 |
| 240 | 7,600 K | 0.01 |
| 255 | 7,500 K | 0.01 |

Table 1 illustrates the setting color temperature and the Δu'v' corresponding to the gradation of 176 or more. However, the setting color temperature and the Δu'v' at the gradation of 176 or below can be determined by the same method. Further, the Δu'v' is constantly maintained as the reference Δu'v' with respect to all of the gradations, thereby allowing the color sensation between the respective gradations of the gray level to have linearity.

At operation S14, coordinates of the display apparatus are set to allow the display apparatus to display a picture based on the coordinates measured according to the respective gradations on the CbCr coordinate system. Here, the coordinates of the display apparatus can be set by directly inputting the CbCr coordinates corresponding to each gradation thereto, or by converting the CbCr coordinates into RGB data to be set as an RGB value of the display apparatus.

Figure 5:
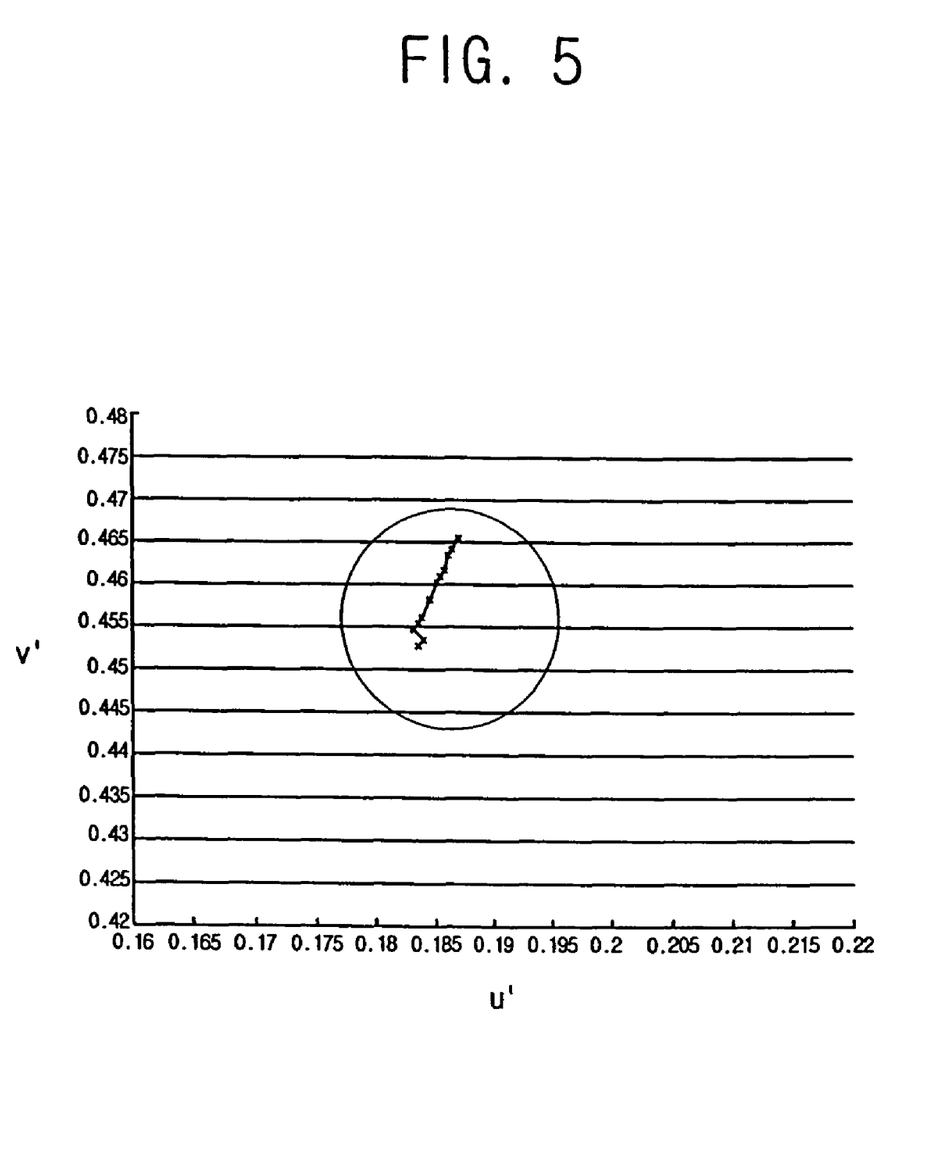
FIG. 5 is a graph illustrating data measured with respect to a picture of which the displaying state is adjusted in the display apparatus of FIG. 3.

Referring to FIG. 5, after setting the coordinates of the display apparatus according to the respective gradations of the gray level, the data measured about each gradation of the gray level can be reflected on a uv coordinate system. As shown therein, the reference Δu'v' is maintained constantly, and measured points are aligned, so that directionality is maintained.

As described above, the reference color temperature and the reference Δu'v' are determined, the setting color temperature corresponding to each gradation of the gray level is determined according to the reference color temperature so as to make the color temperature differences between the adjacent gradations of the gray level be within the predetermined color temperature range, the coordinates corresponding to each gradation are measured within the gray area (GA) formed by the gray level and displayable in the display apparatus on a predetermined color coordinate system corresponding to the reference Δu'v' and the setting color temperature corresponding to each gradation, and the coordinates of the display apparatus are set based on the coordinates measured according to each gradation of the gray level of the display apparatus, so that the color sensation between the gradations of the gray level can have the directionality and the linearity, thereby preventing the color sensation from being distorted, and uniformizing the color sensation.

As described above, the present general inventive concept provides a method of adjusting a displaying state of a display apparatus, in which color sensation between gradations of a gray level is varied to have directionality and linearity, thereby enhancing color representation.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of adjusting a displaying state of a display apparatus, comprising:
    determining a reference color temperature and a reference Δu'v', the reference Δu'v' being smaller than a predetermined color temperature variation;
    determining setting color temperatures corresponding to gradations of a gray level according to the reference color temperature to make color temperature differences between adjacent gradations of the gray level be within a predetermined color temperature range, and maintaining Δu'v' with respect to the gradations of the gray level;
    measuring coordinates according to the gradations within a gray area formed by the gray level displayable in the display apparatus on a predetermined color coordinate system corresponding to the reference Δu'v' and the setting color temperatures corresponding to the gradations; and
    setting the coordinates corresponding to the gradations measured about each gradation of the gray level of the display apparatus.

2. The method according to claim 1, wherein the reference Δu'v' is smaller than 0.02.

3. The method according to claim 1, wherein the color coordinate system includes one of a CbCr coordinate system and an XY coordinate system.

4. The method according to claim 3, wherein the reference Δu'v' is smaller than 0.02.

5. The method according to claim 1, wherein the determining of the reference color temperature and the reference Δu'v' comprises:
    inputting a reference video signal of a white level into the display apparatus;
    measuring a color temperature and a Δu'v' of a reference picture displayed on the display apparatus corresponding to the reference video signal; and
    determining the reference color temperature and the reference Δu'v' according to the measured color temperature and the measured Δu'v' of the reference picture.

6. The method according to claim 5, wherein the reference Δu'v' is smaller than 0.02.

7. The method according to claim 5, wherein the determining of the setting color temperatures comprises determining the setting color temperatures corresponding to the respective gradations so that the setting color temperatures are linearly increased with respect to the respective gradations of the gray level from the measured color temperature of the reference picture.

8. The method according to claim 7, wherein the gradations comprise a 255 gradation and a 240 gradation and the setting color temperature of the 240 gradation is 7600K when the setting color temperature of the 255 gradation is 7500K.

9. The method according to claim 1, wherein the measuring of the coordinates comprises:
    measuring the gray area by measuring data of a picture displayed on the display apparatus; and
    measuring the coordinates so that the coordinates are within the gray area.

10. The method according to claim 1, wherein the setting of the coordinates comprises:
    converting the measured coordinates to RGB data; and
    setting the coordinates according to the RGB data.

11. A method of improving color representation of a display apparatus, the method comprising:
    determining a reference color temperature and a reference color temperature variation corresponding to a reference color, the reference color temperature variation being smaller than a predetermined color temperature variation;
    calculating a plurality of adjustment color temperatures corresponding to a plurality of colors according to the reference color temperature, and maintaining a color temperature variation as the reference color temperature variation with respect to the plurality of colors; and adjusting color temperatures corresponding to colors of a display apparatus according to the plurality of adjustment color temperatures and the reference color temperature variation.

12. The method according to claim 11, further comprising:
maintaining the reference color temperature variation at each of the plurality of colors.

13. The method according to claim 11, wherein the reference color temperature variation is less than 0.02.

14. The method according to claim 11, wherein the reference color is white.

15. The method according to claim 11, wherein the calculating of the plurality of adjustment color temperatures corresponding to the plurality of colors comprises:
calculating the plurality of adjustment color temperatures to be linearly related to the plurality of colors.

16. The method according to claim 15, wherein the calculating of the plurality of adjustment temperatures to be linearly related to the plurality of colors comprises:
increasing the plurality of color temperatures linearly from the reference color temperature as the plurality of colors become darker with respect to the reference color.

17. A method of improving color representation of a display apparatus, the method comprising:
receiving an input white level reference signal;
determining a reference color temperature and a reference color temperature variation based on the input white level reference signal;
determining a plurality of setting color temperatures corresponding to gray level gradations based on the reference color temperature;
measuring coordinates corresponding to the reference color temperature variation and the setting color temperatures corresponding to the gray level gradations; and
setting coordinates of the display apparatus based on the measured coordinates.

18. A method of improving color representation of a display apparatus, the method comprising:
receiving an input white level reference signal;
determining a reference color temperature and a reference color temperature variation based on a color reference signal and the input white level reference signal;
determining a plurality of setting color temperatures corresponding to gray level gradations based on the reference color temperature;
measuring coordinates corresponding to the reference color temperature variation and the setting color temperatures corresponding to the gray level gradations; and
inputting into the display apparatus the measured coordinates to maintain the directionality and linearity of the gray level gradations.

19. A method of adjusting a display of a display apparatus, the method comprising:
receiving an input white level reference signal;
measuring a reference color temperature and a reference color temperature variation from a reference image signal;
determining second color temperatures for gradations of a gray level according to the reference color temperature and the input white level reference signal; and
adjusting the display of the display apparatus with coordinates measured corresponding to the reference color temperature variation and the second color temperatures at the gradations.

\* \* \* \* \*